(12) United States Patent
Kotera et al.

(10) Patent No.: US 8,349,523 B2
(45) Date of Patent: Jan. 8, 2013

(54) ELECTROLYTE MEMBRANE FOR POLYMER ELECTROLYTE FUEL CELLS, PROCESS FOR ITS PRODUCTION AND MEMBRANE-ELECTRODE ASSEMBLY FOR POLYMER ELECTROLYTE FUEL CELLS

(75) Inventors: Seigo Kotera, Chiyoda-ku (JP); Hiroyuki Watabe, Chiyoda-ku (JP); Shigeru Aida, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 677 days.

(21) Appl. No.: 12/408,191

(22) Filed: Mar. 20, 2009

(65) Prior Publication Data

US 2009/0239123 A1    Sep. 24, 2009

(30) Foreign Application Priority Data

Mar. 21, 2008 (JP) .................................. 2008-073693

(51) Int. Cl.
*H01M 4/02* (2006.01)

(52) U.S. Cl. ........ 429/530; 204/450; 204/481; 204/518; 204/520; 204/522; 204/524; 204/536; 264/104; 428/220; 428/332; 428/339; 428/364; 428/397; 428/421; 521/25; 521/27; 521/29; 521/38; 523/310; 526/250; 528/401

(58) Field of Classification Search .................. 523/310; 526/250; 528/401; 429/33; 428/220, 332, 428/339, 364, 397, 421; 264/104; 204/450, 204/481, 518, 520, 522, 523, 524, 536; 521/25, 521/27, 29, 38

See application file for complete search history.

(56) References Cited

U.S. PATENT DOCUMENTS

| 6,277,512 B1 * | 8/2001 | Hamrock et al. ............. 429/492 |
| 2002/0128412 A1 * | 9/2002 | Kitahara et al. ............. 526/250 |
| 2005/0214611 A1 | 9/2005 | Hommura |
| 2006/0159973 A1 * | 7/2006 | Kotera et al. ................... 429/33 |

FOREIGN PATENT DOCUMENTS

| JP | 5-75835 | 10/1993 |
| JP | 6-231779 | 8/1994 |
| JP | 7-68377 | 7/1995 |
| JP | 2003-297394 | 10/2003 |
| JP | 2007-18995 | 1/2007 |
| WO | WO 2004/011535 A1 | 2/2004 |

OTHER PUBLICATIONS

U.S. Appl. No. 12/431,445, filed Apr. 28, 2009, Kotera, et al.

* cited by examiner

*Primary Examiner* — Robert C Boyle
(74) *Attorney, Agent, or Firm* — Oblon, Spivak, McClelland, Maier & Neustadt, L.L.P.

(57) ABSTRACT

To provide an electrolyte membrane having excellent dimensional stability even upon absorption of water, a high proton conductance and high power generation performance; and a process for producing the electrolyte membrane with a high productivity.

An electrolyte membrane for polymer electrolyte fuel cells, which is made mainly of an ion exchange resin and reinforced with a nonwoven fabric made of fiber of a fluororesin wherein at least some of intersecting points of the fiber are fixed, and which has, as the outermost layer on one side or each side, a layer not reinforced, made of an ion exchange resin which may be the same as or different from the above ion exchange resin, wherein the fluororesin is an ethylene/tetrafluoroethylene copolymer having a melting point of at most 240° C., and the above fixing is fixing by fusion of the fiber.

16 Claims, 3 Drawing Sheets

ELECTROLYTE MEMBRANE FOR POLYMER ELECTROLYTE FUEL CELLS, PROCESS FOR ITS PRODUCTION AND MEMBRANE-ELECTRODE ASSEMBLY FOR POLYMER ELECTROLYTE FUEL CELLS

BACKGROUND OF THE INVENTION

1. Field of the Invention

The present invention relates to an electrolyte membrane for polymer electrolyte fuel cells, reinforced with a nonwoven fabric, a process for its production and a membrane-electrode assembly for polymer electrolyte fuel cells, having the electrolyte membrane.

2. Discussion of Background

In recent years, researches have been in progress for polymer electrolyte fuel cells employing a proton-conductive polymer membrane as an electrolyte membrane. Such polymer electrolyte fuel cells have characteristics such that they are operable at a low temperature, provide a high output density and can be small-sized, and thus, they are expected to be prospective in their use as e.g. power sources for vehicles.

As an electrolyte membrane for polymer electrolyte fuel cells, a proton conductive ion exchange membrane having a thickness of from 10 to 200 μm is commonly used. Particularly, a cation exchange membrane made of a perfluorocarbon polymer having sulfonic groups (hereinafter referred to as a sulfonic perfluorocarbon polymer) is excellent in basic properties and thus is widely studied.

As an electrolyte membrane for fuel cells intended for practical use on vehicles, one having a particularly low ohmic loss is desired. The ohmic loss of a membrane depends on the proton conductivity of the electrolyte polymer to be used.

As a method for reducing the electric resistance of such a cation exchange membrane, the sulfonic group concentration may be increased, or the membrane thickness may be reduced. However, if the sulfonic group concentration is substantially increased, the mechanical strength of the membrane tends to decrease, or the membrane tends to be susceptible to creeping during the operation of the fuel cell for a long period of time, thus leading to a problem such as a decrease in the durability of the fuel cell. On the other hand, if the membrane thickness is reduced, there will be a problem such that the mechanical strength of the membrane tends to be low, and in a case where a membrane-electrode assembly is to be prepared by bonding the membrane to a gas diffusion electrode, such processing tends to be difficult or the handling efficiency tends to be poor.

Further, upon absorption of water, the electrolyte membrane having a high sulfonic group concentration tends to show significantly large dimension change of membrane in plane, whereby various problems are likely to be brought about. For example, when a membrane-electrode assembly is assembled in a fuel cell, which is then operated, the membrane will be swelled by water formed by the reaction or by humidification, etc. supplied together with the fuel gas, whereby the size of the membrane will be increased. As the membrane and the electrode are bonded, the electrode usually follows the dimensional change of the membrane. The membrane-electrode assembly is usually restricted by a separator or the like, having grooves formed as flow channels for a gas, whereby the increase in the dimension of the membrane creates "wrinkles". And, such wrinkles will fill in the grooves of the separator to hinder the gas flow.

As a method to solve such a problem, Patent Document 1 proposes a method wherein a porous material made of polytetrafluoroethylene (hereinafter referred to as PTFE) is impregnated with a sulfonic perfluorocarbon polymer. However, the porous material of PTFE is relatively soft from the nature of the material, whereby it is required to apply stretching operation at a high stretching rate and the method can hardly be said to be highly productive. Further, Patent Document 2 proposes a method of filling an ion exchange resin to a porous material made of a polyolefin, but the chemical durability was inadequate, and there was a problem in the stability for a long period of time.

Further, as another reinforcing method, a method of employing fluororesin fiber has been proposed. Patent Document 3 proposes a method for producing a cation exchange membrane reinforced with a reinforcing material of a fibril-form fluorocarbon polymer, and Patent Document 4 discloses a method for preparing a polymer membrane reinforced by short fibers of a fluororesin. In the electrolyte membranes produced by these methods, the reinforcing materials themselves were not particularly positively entangled or bonded, whereby the reinforcing efficiency was poor, and it was necessary to incorporate a relatively large amount of such reinforcing materials. In such a case, processing to a thin film tended to be difficult, and an increase in the membrane resistance was likely to be brought about.

Further, Patent Document 5 proposes an electrolyte membrane for polymer electrolyte fuel cells, reinforced by a fluorinated fiber sheet wherein fluorofibers being non-continuous short fibers having a length of at most 15 mm are bonded one another by a binder such as viscose, carboxymethylcellulose or polyvinyl alcohol. Such a binder is an impurity for the electrolyte membrane for fuel cells, and the remaining binder may sometimes impair the durability of the fuel cells. Further, in Patent Document 5, fibers having a relatively large fiber diameter i.e. a fiber diameter of 15 μm, are employed to increase the reinforcing effect, but in order to realize sufficient bonding of the fibers to one another, the reinforcing material is required to have a thickness of few times the fiber diameter, whereby it is considered that an increase in the membrane resistance may easily be brought about. Further, in the method of processing the non-continuous short fibers by a method such as a paper making method, there will be a problem in making the membrane to be thin, such that with extremely thin fibers, handling is practically difficult.

Further, Patent Document 6 discloses a construction of an electrolyte membrane reinforced by a nonwoven fabric capable of solving such problems and a process for its production. By such means, it is possible to obtain a high performance and high durability electrolyte membrane for fuel cells, which provides both sufficient power generation performance and durability, but further improvement in the productivity has been desired.

Patent Document 1: JP-B-5-75835 (claims)
Patent Document 2: JP-B-7-68377 (claims)
Patent Document 3: JP-A-6-231779 (claims)
Patent Document 4: WO04/011535 (claims)
Patent Document 5: JP-A-2003-297394 (claims, paragraphs 0012 and 0026)
Patent Document 6: JP-A-2007-18995 (claims)

SUMMARY OF THE INVENTION

The present invention has been made in view of such problems, and it is an object of the present invention to provide an electrolyte membrane for polymer electrolyte fuel cells having excellent dimensional stability even upon absorption of water, high proton conductivity and high power generation performance, with high productivity. Further, it is another object to provide a process for producing such an electrolyte membrane with high productivity. It is still another object to provide, at a low cost, a membrane-electrode assembly for polymer electrolyte fuel cells having a high output and excellent durability, as it has such an electrolyte membrane.

The electrolyte membrane for polymer electrolyte fuel cells of the present invention is an electrolyte membrane for polymer electrolyte fuel cells, which is made mainly of an ion exchange resin and reinforced with a nonwoven fabric made of fiber of a fluororesin wherein at least some of intersecting points of the fiber are fixed, and which has, as the outermost layer on one side or each side, a layer not reinforced, made of an ion exchange resin which may be the same as or different from the above ion exchange resin, wherein the fluororesin is an ethylene/tetrafluoroethylene copolymer having a melting point of at most 240° C., and the above fixing is fixing by fusion of the fiber.

It is preferred that in the ethylene/tetrafluoroethylene copolymer, the molar ratio of repeating units based on ethylene to repeating units based on tetrafluoroethylene is from 80/20 to 45/55.

It is preferred that the fiber has an average fiber diameter of from 0.01 μm to 7 μm.

It is preferred that the entire thickness of the electrolyte membrane for polymer electrolyte fuel cells is from 7.5 μm to 25 μm.

It is preferred that the layer not reinforced has a thickness of at least the radius of the average fiber diameter of the fiber.

The process for producing an electrolyte membrane for polymer electrolyte fuel cells is characterized in that the electrolyte membrane for polymer electrolyte fuel cells is an electrolyte membrane which is made mainly of an ion exchange resin and reinforced with a nonwoven fabric made of fiber of an ethylene/tetrafluoroethylene copolymer having a melting point of at most 240° C. wherein at least some of intersecting points of the fiber are fixed by fusion of the fiber, and which has, as the outermost layer on one side or each side, a layer not reinforced, made of an ion exchange resin which may be the same as or different from the above ion exchange resin, and the nonwoven fabric is formed via a step of adjusting the thickness by a hot roll press method of a roll-to-roll system employing a resin support.

The process preferably comprises dispensing a melt-moldable fluororesin in a molten state from a spinning nozzle, stretching and spinning it by a gas discharged from a gas discharge nozzle disposed in the vicinity of the spinning nozzle, to obtain the fiber, and forming the fiber into the nonwoven fabric.

In the process, it is preferred that in the ethylene/tetrafluoroethylene copolymer, the molar ratio of repeating units based on ethylene to repeating units based on tetrafluoroethylene is from 80/20 to 45/55.

In the process, it is preferred that the fiber has an average fiber diameter of from 0.01 μm to 7 μm.

In the process, it is preferred that the entire thickness of the electrolyte membrane for polymer electrolyte fuel cells is from 7.5 μm to 25 μm.

In the process, it is preferred that the layer not reinforced has a thickness of at least the radius of the average fiber diameter of the fiber.

The membrane/electrode assembly for polymer electrolyte fuel cells of the present invention comprises a cathode and an anode, each having a catalyst layer comprising a catalyst and an ion exchange resin, and a polymer electrolyte membrane interposed between the cathode and the anode, wherein the polymer electrolyte membrane is made of the electrolyte membrane for polymer electrolyte fuel cells of the present invention.

The electrolyte membrane for polymer electrolyte fuel cells of the present invention has good dimensional stability even upon absorption of water, high proton conductivity, high power generation performance and high productivity with a low cost.

According to the process for producing an electrolyte membrane for polymer electrolyte fuel cells of the present invention, it is possible to produce the electrolyte membrane of the present invention with high productivity.

The membrane-electrode assembly of the present invention provides a high output with a low cost and is excellent in durability.

BRIEF DESCRIPTION OF THE DRAWINGS

In the accompanying drawings.

In the Figs., reference numeral 1 indicates a fluororesin, 2 a gas, 3 an outlet of a spinning nozzle, 4 an outlet of spinning gas discharge nozzle, 31 a single screw extruder, 32 a special die, 33 a special nozzle for the process for producing a melt-blown nonwoven fabric, 34 a nonwoven fabric A1, 35 a stainless steel mesh, 36 hot air for stretching, 37 a driven stage, 38 an air-suction device, 39 an outlet for excess resin, 41 a nonwoven fabric continuous material RA1, 42 a continuous PET support, 43 continuous PET support/densified nonwoven fabric continuous material RAP1, 44 and 54 metal rolls, 45 and 55 rubber rolls, 51 an intermediate laminate P1, 52 a die coater, and 53 a drying furnace

DETAILED DESCRIPTION OF PREFERRED EMBODIMENTS

The electrolyte membrane for polymer electrolyte fuel cells (hereinafter sometimes referred to simply as the electrolyte membrane) of the present invention is an electrolyte membrane which is made mainly of an ion exchange resin and reinforced with a nonwoven fabric made of fiber of a fluororesin wherein at least some of intersecting points of the fiber are fixed, and which has, as the outermost layer on one side or each side, a layer not reinforced, made of an ion exchange resin which may be the same as or different from the above ion exchange resin, wherein the fluororesin is an ethylene/tetrafluoroethylene copolymer having a melting point of at most 240° C., and the fixing of at least some of intersecting points of the fiber is fixing by fusion of the fiber.

The electrolyte membrane of the present invention is reinforced by the above nonwoven fabric, whereby the loss of proton conductance by the reinforcement is little, and it has a sufficiently high strength even if the membrane thickness is thin and is excellent in the dimensional stability upon absorption of water. Further, as the outermost layer on one side or each side, it has a layer not reinforced, made of an ion exchange resin which may be the same as or different from the above ion exchange resin, whereby when it is used as a polymer electrolyte membrane for a polymer electrolyte fuel cell, it is possible to lower the contact resistance at the bonded portion of the electrolyte membrane and an electrode.

Accordingly, the polymer electrolyte fuel cell having a membrane-electrode assembly employing such an electrolyte membrane is capable of obtaining a high output constantly even when operated for a long period. Further, a fluororesin having a melting point of at most 240° C. is employed, whereby adjustment of the thickness (densification) of the nonwoven fabric can be carried out at a low temperature at a level of at most 240° C., and it becomes possible to produce the electrolyte membrane by a continuous process of a roll-to-roll system by using a flexible and inexpensive resin support such a polyethylene terephthalate film (hereinafter sometimes referred to as PET), and very high productivity can be realized.

The nonwoven fabric to be used for the electrolyte membrane of the present invention is a nonwoven fabric wherein at least some of intersecting points of the fiber are fixed by fusion of the fiber. Here, the intersecting points of the fiber in the present invention include both intersections of one fiber filament and intersections of different fiber filaments.

The nonwoven fabric in the present invention is made of fiber of a fluororesin, and the fiber in the present invention means one having an aspect ratio of at least 10,000. The fiber length is preferably at least 20 mm.

The nonwoven fabric in the present invention is made of fiber of a fluororesin, and the fiber in the present invention means one having an aspect ratio of at least 10,000, when the aspect ratio of fiber=length of fiber/diameter of fiber.

The average fiber diameter of the fiber is preferably from 0.01 µm to 7 µm, more preferably from 0.01 µm to 3 µm. By adjusting the average fiber diameter of the fiber to be smaller than 5 µm, the proton transfer may be carried out more smoothly, whereby a decrease of the proton conductance due to the reinforcement can be suppressed. Further, by adjusting the average fiber diameter to be larger than 0.01 µm, it is possible to increase the region of the intersecting points of the fiber in the same membrane thickness, whereby the strength of the nonwoven fabric can further be increased, and the dimensional stability of the electrolyte membrane can be improved. On the other hand, if the fiber diameter is too small, the tensile strength per fiber filament tends to be weak, and it becomes difficult to practically use it from the viewpoint of the handling. Here, for the average fiber diameter in the present invention, the fiber diameters of 200 fiber filaments are measured by an electron microscopic observation, and the average value of the data excluding the data of the ten smallest diameters and the ten largest diameters, is taken as the average fiber diameter. The fiber length is preferably at least 20 mm.

Further, if a nonwoven fabric is prepared by using fiber having a small average fiber diameter, it is usually possible to obtain only a bulky nonwoven fabric, and it is required to carry out a step of adjusting the thickness by means of a densification process. In such a case, it is difficult to adjust the thickness of only a thin nonwoven fabric from the viewpoint of a handling efficiency, and it is required to carry out the step of adjusting the thickness on a support which is inexpensive and has sufficient dimensional stability and heat resistance.

In such a case, it is possible to remarkably improve the productivity of the electrolyte membrane by carrying out the thickness adjustment by a continuous production process such as a roll-to-roll system.

In the present invention, the fluororesin having a melting point of at most 240° C., constituting the nonwoven fabric, is preferably a homopolymer or a copolymer containing at least one type of monomer units based on monomers, such as a perfluoroolefin such as tetrafluoroethylene or hexafluoropropylene, chlorotrifluoroethylene or a perfluoro(alkyl vinyl ether).

Specifically, it may, for example, be a tetrafluoroethylene/perfluoro(alkyl vinyl ether) copolymer (hereinafter sometimes referred to simply as "PFA"), an ethylene/tetrafluoroethylene copolymer (hereinafter sometimes referred to simply as "ETFE"), a tetrafluoroethylene/hexafluoropropylene copolymer (hereinafter sometimes referred to simply as "FEP"), a polychlorotrifluoroethylene (hereinafter sometimes referred to simply as "PCTFE"), an ethylene/chlorotrifluoroethylene copolymer (hereinafter sometimes referred to simply as "ECTFE"), a polyvinylidene fluoride polymer (hereinafter sometimes referred to simply as "PVdF"), a polyvinyl fluoride polymer (hereinafter sometimes referred to simply as "PVF"), a copolymer comprising a plurality of monomer units constituting these polymers, or a blend of these polymers. Among these fluororesins, a melt-moldable fluororesin such as ETFE, PFA, FEP or PVDF is preferred.

It is particularly preferred to employ ETFE as the fluororesin having a melting point of at most 240° C., constituting the nonwoven fabric, since it is distinctly superior in the moldability and mechanical strength. Commonly known ETFE has a high melting point which is usually within a range of from about 260 to 270° C.

The melting point of ETFE which may be used for the electrolyte membrane of the present invention is preferably from 120 to 240° C., more preferably from 150 to 240° C., most preferably from 180 to 240° C.

As shown in Examples given hereinafter, the melting point of ETFE is one obtained from the endothermic peak when it is heated from room temperature to 300° C. at a rate of 10° C./min in an atmosphere of air by means of a scanning differential calorimeter (DSC220CU, manufactured by Seiko Instruments Inc.).

ETFE which may be used for the electrolyte membrane of the present invention comprises repeating units based on ethylene (hereinafter sometime referred to as "E") and repeating units based on tetrafluoroethylene (hereinafter sometimes referred to as "TFE"), wherein the content ratio (molar ratio) is preferably from 90/10 to 35/65, more preferably from 80/20 to 45/55, most preferably from 75/25 to 55/45.

If the molar ratio of "repeating units based on E"/"repeating units based on TFE" is too large, the heat resistance, weather resistance, chemical resistance, reagent-penetration-preventing property, etc. of ETFE may deteriorate. On the other hand, if the molar ratio is too small, the mechanical strength, melt-moldability, etc. may deteriorate. If the molar ratio is within the above range, ETFE will be excellent in the heat resistance, weather resistance, chemical resistance, reagent-penetration-preventing property, mechanical strength, melt-moldability, etc.

Further, in addition to the above mentioned repeating units based on E and repeating units based on TFE, ETFE may contain repeating units based on at least one member of other monomers within a range not to impair the essential properties.

Other monomers include, for example, an α-olefin such as propylene or butene; a compound represented by $CH_2=CX(CF_2)_nY$ (wherein each of X and Y which are independent of each other, is hydrogen or a fluorine atom, and n is an integer of from 2 to 8); a fluoroolefin having hydrogen atoms in an unsaturated group, such as vinylidene fluoride (VDF), vinyl fluoride (VF), trifluoroethylene or hexafluoroisobutylene (HFIB); and a fluoroolefin having no hydrogen atom in an unsaturated group (excluding TFE), such as hexafluoropropylene (HFP), chlorotrifluoroethylene (CTFE), perfluoro(m- ethyl vinyl ether) (PMVE), perfluoro(ethyl vinyl ether) (PEVE), perfluoro(propyl vinyl ether) (PPVE), perfluoro(butyl vinyl ether) (PBVE) or another perfluoro(alkyl vinyl ether) (PAVE). Such other monomers may be used alone or in combination as a mixture of two or more of them.

Among such other monomers, it is particularly preferred to use a compound represented by the above formula $CH_2=CX(CF_2)_nY$ (hereinafter referred to as "FAE") As mentioned above, FAE is a compound represented by the formula $CH_2=CX(CF_2)_nY$ (wherein each of X and Y which are independent of each other, is a hydrogen atom or a fluorine atom, and n is an integer of from 2 to 8). If n in the formula is less than 2, the properties of ETFE are likely to be inadequate (e.g. stress cracking of the ETFE-formed product occurs). On the other hand, if n in the formula exceeds 8, such tends to be disadvantageous from the viewpoint of the polymerization reactivity.

FAE may, for example, be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$, or $CH_2=CH(CF_2)_8H$. One type of FAE may be used alone, or two or more types of FAE may be used in combination.

Among them, a compound represented by $CH_2=CH(CF_2)_nY$ is more preferred. In such a case, n in the formula is preferably n=2 to 8, whereby the molded product will be excellent in stress cracking resistance, and n=2 to 4 is most preferred.

The content of repeating units based on FAE in ETFE which may be used in the present invention, is preferably from 0.01 to 20 mol %, more preferably from 0.1 to 15 mol %, further preferably from 0.4 to 10 mol %, in the total repeating units in the composition. If the content of FAE is less than the above value, the stress cracking resistance of a molded product to be formed from ETFE tends to be low, and there may be a case where a breakage phenomenon such as breakage under a stress occurs, and if it exceeds the above value, the mechanical strength of the composition may be deteriorated.

ETFE is basically a highly melt-flowable ethylene/tetrafluoroethylene copolymer composition characterized in that its melt viscosity is from 80 to 2,000 Pa·s, and the tensile elongation is from 200 to 500% in a tensile test of material disclosed in e.g. ASTM D638. ETFE which may be used in the present invention preferably has a melt viscosity of from 100 to 1,500 Pa·s and a tensile elongation of from 250 to 450%. More preferably, its melt viscosity is from 100 to 1,200 Pa·s, and its tensile elongation is from 350 to 450%.

When the melt viscosity of the ETFE composition is within this range, there will be no practical problem with respect to the mechanical strength. On the other hand, if the tensile elongation is less than this range, the molded product tends to be brittle, such being practically undesirable.

With respect to ETFE which may be used for the electrolyte membrane of the present invention, the melt viscosity is basically adjusted by polymerization. However, the melt viscosity may be adjusted by blending ETFE (A) having a lower melt viscosity of from 60 to 400 Pa·s with ETFE (B) having a higher melt viscosity of from 600 to 10,000 Pa·s in a mass ratio of (A)/(B)=50/50 to 99/1. Preferably, the melt viscosity of ETFE (A) is from 80 to 300 Pa·s, and the melt viscosity of ETFE (B) is from 1,000 to 7,000 Pa·s. If the melt viscosity of (A) or (B) is higher than such a level, no adequate melt-flowability will be obtained. On the other hand, if the is melt viscosity is lower than such a level, the tensile elongation of the obtainable molded product tends to be inadequate.

Further, the blend ratio of (A)/(B) is preferably from 60/40 to 97/3, more preferably from 70/30 to 95/5. If the blend ratio exceeds the above defined value or is less than such a value, the obtainable ETFE composition will not be one which satisfies the characteristics of the melt viscosity being from 80 to 500 Pa·s and the tensile strength being from 200 to 500%.

The melt viscosity (the melt flowability) is preferably measured by a capillary flowability-measuring apparatus (capillary rheometer). This is one wherein a molten resin is extruded at a constant rate to let it pass through a capillary, whereby the melt viscosity is obtained by measuring the stress required for the extrusion. The lower the melt viscosity of ETFE, the lower the molecular weight of the ETFE. The higher the melt viscosity, the higher the molecular weight of the ETFE.

The melt flowability of ETFE may, for example, be measured as disclosed in the Examples given hereinafter, by setting an orifice having a diameter of 1 mm and a length of 10 mm with a furnace inner diameter of 9.55 mm in a melt flowability-measuring apparatus "Capirograph" manufactured by Toyo Seiki Seisaku-sho, Ltd. and measuring the melt flowability under conditions of the cylinder temperature being 240° C., and the piston speed being 10 mm/min.

Here, the temperature to melt ETFE is preferably a temperature higher by from 5 to 30° C. than the melting point of the ETFE. If the measurement is carried out under a condition lower than this temperature, ETFE will not be sufficiently melted, and the measurement tends to be difficult, and if the measurement is carried out under a condition substantially higher than this temperature, the viscosity of ETFE tends to be too low, and the molten ETFE tends to flow out from the orifice in a short time, whereby the measurement tends to be difficult.

A method for producing ETFE which may be used in the present invention, may, for example, be (1) a method of adjusting the molecular weight during the polymerization, (2) a method wherein an energy such as heat or radiation is applied to ETFE obtained by polymerization to cleave molecules to lower the viscosity, or (3) a method for producing it by chemically cleaving the molecular chains of ETFE obtained by polymerization, by radicals, specifically, a method wherein ETFE and an organic peroxide are melt-kneaded by an extruder to cleave molecular chains of ETFE by generated radicals to reduce the viscosity. In principle, any method is applicable, but the method (1) is most preferred, since the productivity is high.

A polymerization method for ETFE which may be used in the present invention is not particularly limited, and it is possible to employ a method wherein ethylene and tetrafluoroethylene are introduced into a reactor and copolymerized by means of a radical polymerization initiator or a chain transfer agent which is commonly employed. Examples of the polymerization method include, as per se known, bulk polymerization; solution polymerization using, as a polymerization medium, an organic solvent such as a fluorinated hydrocarbon, a chlorinated hydrocarbon, a fluoro-chlorinated hydrocarbon, an alcohol or a hydrocarbon; suspension polymerization using as a polymerization medium an aqueous medium and, if necessary, a suitable organic solvent; and emulsion polymerization using an aqueous medium as the polymerization medium and an emulsifier. However, most preferred is a solution polymerization wherein ethylene and tetrafluoroethylene as a fluorinated monomer are copolymerized in the presence of a radical polymerization initiator, a chain transfer agent and a polymerization medium. The polymerization can be carried out in a batch system or continuous system operation by using a single vessel- or multi vessel-type stirring-type polymerization apparatus, a tubular polymerization apparatus or the like.

The radical polymerization initiator is preferably an initiator having a half-life of 10 hours at a temperature of from 0 to 100° C., more preferably at a temperature of from 20 to 90° C. It may, for example, be an azo compound such as azobisisobutyronitrile; a peroxydicarbonate such as diisopropyl peroxydicarbonate; a peroxyester such as tert-butyl peroxypivalate, tert-butyl peroxyisobutyrate or tert-butyl peroxyacetate; a non-fluorine type diacylperoxide such as isobutyl peroxide, octanoyl peroxide, benzoyl peroxide or lauroyl peroxide; a fluorine-containing diacyl peroxide such as $(Z(CF_2)_p COO)_2$ (wherein Z is a hydrogen atom, a fluorine atom or a chlorine atom, and p is an integer of from 1 to 10); or an inorganic peroxide such as potassium persulfate, sodium persulfate or ammonium persulfate.

The polymerization medium may, for example, be an organic solvent such as a fluorinated hydrocarbon, a chlorinated hydrocarbon, a fluoro-chlorinated hydrocarbon, an alcohol or a hydrocarbon, as mentioned above.

The chain transfer agent may, for example, be an alcohol such as methanol or ethanol; a chlorofluorohydrocarbon such as 1,3-dichloro-1,1,2,2,3-pentafluoropropane or 1,1-dichloro-1-fluoroethane; or a hydrocarbon such as pentane, hexane or cyclohexane. The amount of the chain transfer agent is usually at a level of from 0.01 to 100 mass %, based on the polymerization medium. By adjusting the concentration of the chain transfer agent, it is possible to adjust the melt viscosity (molecular weight) of the obtainable ETFE. Namely, as the concentration of the chain transfer agent is made high, it is possible to obtain ETFE having a low molecular weight.

In a case where an ethylene/tetrafluoroethylene copolymer (A) having a low molecular weight is to be prepared, it is preferred to employ, as the polymerization medium, 1,3-dichloro-1,1,2,2,3-pentafluoropropane which is commonly used as a chain transfer agent.

The polymerization conditions are not particularly limited, but the polymerization temperature is usually preferably from 0 to 100° C., more preferably from 20 to 90° C. The polymerization pressure is preferably from 0.1 to 10 MPa, more preferably from 0.5 to 3 MPa. As the polymerization pressure is higher within the above range, the obtainable polymer tends to have a higher molecular weight and a higher melt viscosity. Accordingly, by adjusting the polymerization pressure, it is possible to adjust the melt viscosity. The polymerization time may vary depending upon the polymerization temperature, the polymerization pressure, etc., but it is usually preferably from 1 to 30 hours, more preferably from 2 to 10 hours.

The amount of ETFE to the polymerization medium at the termination of the polymerization reaction is usually at a level of from 0.03 to 0.2 g/cm³, and it is also possible to adjust the molecular weight of ETFE by this concentration. That is, as the ETFE concentration is made lower within the above range, it is possible to obtain ETFE having a lower molecular weight.

By using the fluororesin as described above, a nonwoven fabric can be obtained.

As a method for producing fiber of the above described fluororesin, it is preferred to employ a melt-blown method as a method for producing a nonwoven fabric in a case where the fluororesin is a melt-moldable fluororesin such as PFA or ETFE.

The melt-blown method is a production process which comprises dispensing a melt-moldable fluororesin in a molten state from a spinning nozzle, stretching and spinning it by a gas discharged from a gas discharge nozzle disposed in the vicinity of the spinning nozzle, to obtain a continuous fiber, and forming the fiber into the nonwoven fabric, and it is thereby possible to form an extremely fine fiber.

As compared with other methods for preparing nonwoven fabrics wherein fiber is formed from the resin and then it is formed into a nonwoven fabric, the melt-blown method has high productivity, since formation of the fiber and formation of the fabric can be carried out substantially simultaneously. Further, the fiber constituting the nonwoven fabric can be made very fine, and an increase in the electric resistance of the electrolyte membrane by the reinforcement can be suppressed, whereby it is possible to form a nonwoven fabric most suitable as a reinforcing material for an electrolyte membrane for fuel cells.

A spun-bond method is also known as a direct nonwoven fabric production method of this type, and it is commonly accepted that a nonwoven fabric constituted by a relatively fine fiber is also obtainable by the spun-bond method. However, it is generally accepted that the melt-blown method is more efficient in obtaining a fine fiber.

Figure 1:
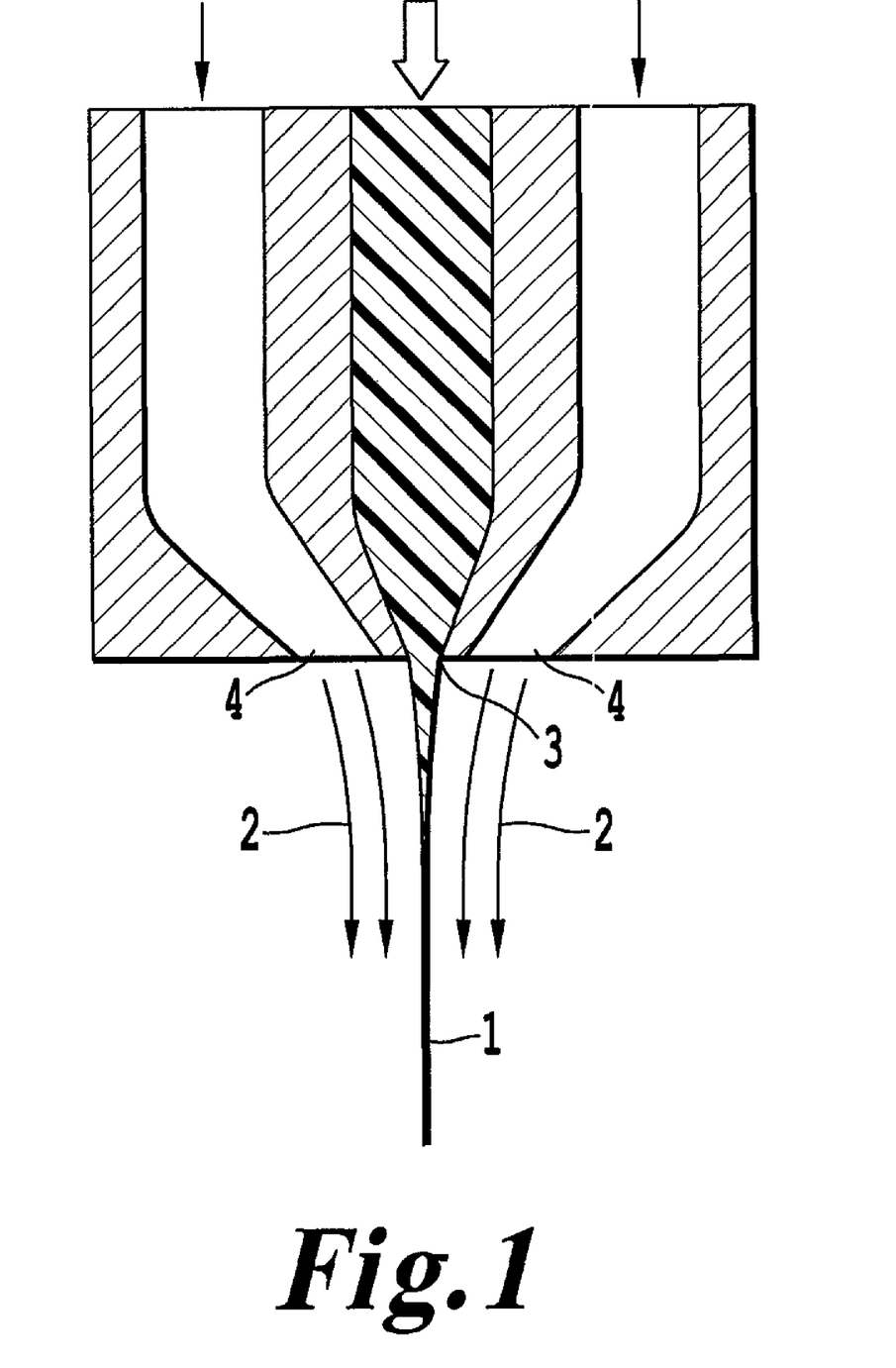
FIG. 1 is a cross sectional view illustrating one embodiment in cross section of a nozzle to be used in an apparatus for producing a melt-blown nonwoven fabric.

FIG. 1 is a cross-sectional view showing one embodiment in cross section of a nozzle to be used in an apparatus for producing a nonwoven fabric by a melt-blown method. In the melt-blown method, the melt-moldable fluororesin 1 is dispensed from an outlet 3 of a spinning nozzle in a molten state, and stretched and spun by a gas 2 discharged from an outlet 4 of a gas discharge nozzle disposed in the vicinity of the spinning nozzle, whereby continuous fiber can be obtained. Such continuous fiber is collected on an air-suction surface, whereby a nonwoven fabric can be formed.

The air-suction surface means, for example, an apparatus capable of forming the dispensed very fine fiber into a fabric form by sucking air through one side of a film substrate in a reduced pressure state. The film substrate having an air permeability is not particularly limited, but it may, for example, be a mesh, a cloth or a porous media, and the material is also not is particularly limited.

With respect to the air-suction function, it is desired to have a sucking ability to sufficiently suck and maintain the spun continuous fiber in the form of a fabric. Accordingly, the air-suction surface preferably has a wind speed of at least 0.1 m/sec. in a distance within 1 cm from the surface. Further, if apertures of the air-suction surface are too large, the fiber itself will be withdrawn into the interior of the mesh and will hardly be peeled, or smoothness is likely to be lost. Accordingly, apertures of the mesh are preferably at most 2 mm, more preferably at most 0.15 mm, further preferably at most 0.06 mm, particularly preferably at most 0.03 mm.

In a case where the film substrate having air-suction ability has flexibility, it may be used as a conveyor for collection having an air-suction function, by placing it on a conveyor capable of rotating it continuously. For example, a method will be possible wherein a film substrate wound up into a roll is continuously dispensed, and a nonwoven fabric is formed on one side thereof, then separated and wound up, whereby the production method can be simplified.

The bulk density of the obtainable nonwoven fabric is influenced by the hardness or thermal property of the resin to be used. By a melt-blown method, it is usually possible to obtain a nonwoven fabric having some of intersecting points of the fiber fused, by employing a resin having a low viscosity. Further, in some cases, such fusion may not take place and a web ("a cotton-like precursor for a nonwoven fabric") may be obtained, which may be collected by a conveyor for collection having an air-suction function and subjected as it is to hot press bonding for adjusting its thickness to obtain a nonwoven fabric having a prescribed bulk density.

In the above-mentioned method for forming a nonwoven fabric, if intersecting points of the fiber are not fixed, handling or an operation such as winding, tends to be difficult. When at least some of intersecting points of the fiber are fixed, the elastic modulus and strength as a nonwoven fabric elemental substance, can be obtained. As a result, a self-sustaining property of the nonwoven fabric itself will be developed, whereby the handling efficiency will be improved, and the production of an electrolyte membrane having the nonwoven fabric will be easy.

In the process for producing an electrolyte membrane of the present invention, the nonwoven fabric is formed via a step of adjusting the thickness by a hot roll press method of a roll-to-roll system employing a resin support. The electrolyte membrane of the present invention is made of a fluororesin having a melting point of at most 240° C., whereby adjustment of the thickness of the nonwoven fabric (densification) can be carried out at a temperature of at most 240° C., and it becomes possible to continuously produce an electrolyte membrane by the roll-to-roll system by using a flexible and inexpensive resin support such as a commonly used polyethylene terephthalate film (hereinafter sometimes referred to as PET), and a very high productivity can be realized.

The above mentioned hot roll press method of a roll-to-roll system is preferably carried out within a temperature range where the fiber undergoes no melt deformation and has a fusing property. In the case of a crystalline fluororesin, the temperature range is preferably from the glass transition temperature to the melting point, more preferably from "the melting point−50° C.", to the melting point, further preferably from "the melting point−20° C." to the melting point, although it depends on the thermal properties of the fluororesin constituting the fiber. In the case of a non-crystalline fluororesin, the temperature range is preferably from "the glass transition temperature−50° C." to the glass transition temperature, more preferably from "the glass transition temperature−20° C." to the glass transition temperature. Further, the pressure at the time of the hot pressing may usually be within a range of from 0.5 to 10 MPa, whereby adjustment of the thickness can be carried out without substantial deformation of the fiber, although it depends also on the above mentioned temperature condition.

Further, in the hot roll press method, it is possible to fix the intersecting points of fiber of the continuous fiber of the fluororesin by fusion of the fiber for densification by means of a common inexpensive roll press lamination apparatus comprising two rolls i.e. a metal roll and a rubber roll, without using a calendering roll comprising two metal rolls, which is costly although it may have heat resistance. Thus, even with a nonwoven fabric precursor having a low density, various after-treatments may be applied while suppressing deformation during e.g. handling to a minimum level.

As a solvent-soluble fluororesin, it is possible to employ, for example, a fluoropolymer having an aliphatic ring on its main chain, a fluoroolefin polymer, or a polyvinylidene fluoride or a polyvinylidene fluoride/hexafluoropropylene copolymer disclosed in JP-A-2007-224466.

These solvent-soluble fluororesins may be applied to the present invention. However, in a complexing process with a matrix electrolyte polymer is usually carried out at a temperature of at least 120° C. in many cases. Accordingly, among the above polymer materials, a polyvinylidene fluoride is preferred.

The solvent-soluble fluororesin may, for example, be a fluoropolymer having an aliphatic ring on its main chain, a fluoroolefin polymer, or a polyvinylidene fluoride or a polyvinylidene fluoride/hexafluoropropylene copolymer as disclosed in JP-A-2007-224466.

As the fluoropolymer having an alicyclic ring in its main chain, it is possible to employ, for example, an amorphous fluororesin manufactured by Asahi Glass Company, Limited (tradename: CYTOP (registered trademark)).

As the fluoroolefin polymer, it is possible to employ, for example, a fluoroolefin polymer manufactured by Asahi Glass Company, Limited (tradename: Lumiflon (registered trademark)).

Among solvent-soluble fluororesins, a polyvinylidene fluoride or tradename teflon (registered trademark) AF manufactured by Du Pont is particularly preferred in that a high temperature process can be used for the complexing process with a matrix electrolyte polymer.

With the fiber produced by the above described production method, the fiber can be made very fine, and it is possible to suppress a decrease of proton conductance through the electrolyte membrane due to the reinforcement, and it is possible to form a nonwoven fabric most suitable as a reinforcing material for an electrolyte membrane for fuel cells.

In the present invention, the ion exchange resin as the main component of the electrolyte membrane may be any cation exchange resin, and it is possible to use a cation exchange resin made of a hydrocarbon polymer or a partially fluorinated hydrocarbon polymer. To be used for a fuel cell, a cation exchange resin made of a sulfonic acid type perfluorocarbon polymer excellent in durability is preferred. The ion exchange resin in the electrolyte membrane may be composed of a single ion exchange resin or may be one having two or more ion exchange resins mixed.

As the sulfonic acid type perfluorocarbon polymer, conventional known polymers may be widely used. For example, the sulfonic acid type perfluorocarbon fiber may be obtained by subjecting a precursor made of a resin having terminal $SO_2F$ to hydrolysis and treatment to an acid form. Here, in this specification, the perfluorocarbon polymer may contain e.g. an etheric oxygen atom.

The above mentioned precursor made of a resin having terminal $SO_2F$ is preferably a copolymer comprising monomer units based on a perfluorocompound represented by $CF_2\!=\!CF\!-\!(OCF_2CFX)_m\!-\!Op\!-\!(CF_2)_n\!-\!SO_2F$ (wherein X is a fluorine atom or a trifluoromethyl group, m is an integer of from to 3, n is an integer of from 0 to 12, and p is 0 or 1, provided that when n=0, p=0 and n=1 to 3) and monomer units based on a perfluoroolefin such as tetrafluoroethylene or hexafluoropropylene, chlorotrifluoroethylene, or a perfluoro (alkyl vinyl ether). Particularly preferred is a copolymer comprising monomer units based on the above perfluorocompound and monomer units based on tetrafluoroethylene.

As a preferred example of the above perfluorocompound, a compound represented by any one of the following formulae, may be mentioned. In the following formulae, q is an integer of from 1 to 8, r is an integer of from 1 to 8, s is an integer of from 1 to 8, and t is an integer of from 1 to 5.

$CF_2\!=\!CFO(CF_2)_qSO_2F$
$CF_2\!=\!CFOCF_2CF(CF_3)O(CF_2)_rSO_2F$
$CF_2\!=\!CF(CF_2)_sSO_2F$
$CF_2\!=\!CF(OCF_2CF(CF_3))_tO(CF_2)_2SO_2F$

Further, a cation exchange resin of a polymer other than the perfluorocarbon polymer may, for example, be a polymer comprising monomer units represented by the following formula (1) and monomer units represented by the following formula (2). Here, $p^1$ is a phenyltriyl group, a biphenyltriyl group, a naphthalenetriyl group, a phenanthrenetriyl group or an anthracenetriyl group, $p^2$ is a phenylene group, a biphenylene group, a naphthylene group, a phenanthrylene group or an anthrylene group, $A^1$ is a $-SO_3M^2$ group (wherein $M^2$ is a hydrogen atom or an alkali metal atom, the same applies hereinafter), a $-COOM^2$ group, or a group convertible to such a group by hydrolysis, and each of $B^1$ and $B^2$ which are independent of each other, is an oxygen atom, a sulfur atom, a sulfonyl group or an isopropylidene group. The structural isomerism of $p^1$ or $p^2$ is not particularly limited. At least one hydrogen atom in $p^1$ or $p^2$ may be substituted by a fluorine atom, a chlorine atom, a bromine atom or a $C_{1-3}$ alkyl group.

$$-P^1-B^1- \quad (1)$$
$$\quad | $$
$$\quad A^1$$
$$-P^2-B^2- \quad (2)$$

In a case where it is used as a polymer electrolyte membrane for a fuel cell, the ion exchange resin in the present invention preferably has an ion exchange capacity of from 0.5 to 2.0 meq/g dry resin, particularly preferably from 0.7 to 1.6 meq/g dry resin. If the ion exchange capacity is too low, the electric resistance tends to be large. The other hand, if the ion exchange capacity is too high, the affinity to water tends to be too strong, and the electrolyte membrane is likely to be dissolved during the power generation.

The thickness of the electrolyte membrane of the present invention is preferably from 7.5 μm to 25 μm. If the thickness of the electrolyte membrane is too thick, the electric resistance of the membrane tends to be large. Further, when it is used as a polymer electrolyte membrane for a fuel cell, the thinner the better, since reverse diffusion of water formed on the cathode side readily takes place. On the other hand, if the thickness of the electrolyte membrane is too thin, it tends to be difficult to obtain mechanical strength, and a trouble such as gas leakage is likely to be brought about. Therefore, with respect to the thickness of the electrolyte membrane of the present invention, the upper limit is preferably at most 25 μm, and the lower limit is preferably at least 7.5 μm, since otherwise, crossover of the raw material gases of both electrodes of the fuel cell tends to remarkably increase. The thickness is more preferably from 7.5 μm to 20 μm.

Further, from the viewpoint of the thickness of the above electrolyte membrane, the thickness of the nonwoven fabric is preferably at least 1 μm and at most 15 μm, more preferably from 1 μm to 10 μm. The unit weight of the nonwoven fabric at that time is preferably from 0.5 cc/m² to 5 cc/m² with a view to accomplishing both the reinforcing effect and reduction of the membrane electric resistance. For example, by carrying out densification on a support such as a polyethylene terephthalate film, it is possible to make the thickness region to be uniform.

A method for preparing the electrolyte membrane which is made mainly of an ion exchange resin and reinforced with a nonwoven fabric may, for example, be (1) a cast method wherein a nonwoven fabric is coated or impregnated with a solution or dispersion of the ion exchange resin, followed by drying to form a film, or (2) a method wherein a preliminarily formed membrane-form material of the ion exchange resin is laminated on the nonwoven fabric under heating for integration. Such a composite membrane of the nonwoven fabric with the ion exchange resin may be strengthened by stretch treatment or the like.

The electrolyte membrane of the present invention has, as the outermost layer on one side or each side, a layer not reinforced, made of an ion exchange resin which may be the same as or different from the above-mentioned ion exchange resin reinforced by the nonwoven fabric. By such a construction, it is possible to lower the electric resistance at the bonded portion of the electrolyte membrane and the electrode, when the electrolyte membrane of the present invention is used as a polymer electrolyte membrane for a polymer electrolyte fuel cell. There may be a case where the layer not reinforced, made of an ion exchange resin, is formed as the outermost layer, when a composite membrane of the nonwoven fabric with the ion exchange resin is formed as described above. Otherwise, following the formation of such a composite membrane, a solution or dispersion of an ion exchange resin may be applied on the surface of such a composite membrane or a single film of an ion exchange resin may be laminated on the surface of such a composite membrane, to form the layer not reinforced, made of the ion exchange resin. It is preferred to have the layer not reinforced, as the outermost layer on each side. The layer not reinforced, made of an ion exchange resin, may contain some components other than the ion exchange resin, which will not bring about an increase in the electric resistance.

The thickness of the layer not reinforced, made of an ion exchange resin, is preferably from 1 to 10 μm per one side, since it is thereby excellent in the barrier function against a fuel gas of the fuel cell and is capable of suppressing the membrane electric resistance. It is more preferably from 2 to 5 μm. Here, in this specification, the thickness of the layer not reinforced, can be measured by observation of the cross section by e.g. an optical microscope, a laser microscope or SEM. The thickness of the layer not reinforced means the shortest distance between the surface of the electrolyte membrane and the fiber of the nonwoven fabric.

When the electrolyte membrane of the present invention is used as a polymer electrolyte membrane for a polymer electrolyte fuel cell, transfer of protons will be shielded by the fiber of the nonwoven fabric. If the thickness of the layer not reinforced, is too thin, the path length for the electric current to make a detour to avoid the fiber will be large, thus causing an unnecessary increase in the electric resistance.

In the electrolyte membrane of the present invention, the thickness of the layer not reinforced, is preferably at least the radius of the average fiber diameter of the fiber of the fluororesin. Especially when the thickness of the layer not reinforced is smaller than one half of the average fiber diameter of the fiber of the fluororesin, the increase in the electric resistance tends to be remarkable. In a case where the thickness of the layer not reinforced is at least a value corresponding to the average fiber radius of the continuous fiber, the detour path length of the electric current may be small, and consequently, an unnecessary increase in a electric resistance can be avoided, such being desirable.

The electrolyte membrane of the present invention may be used as a polymer electrolyte membrane for a membrane-electrode assembly for a polymer electrolyte fuel cell. The membrane-electrode assembly for a polymer electrolyte fuel cell comprises a cathode and an anode, each having a catalyst layer comprising a catalyst and an ion exchange resin, and a polymer electrolyte membrane disposed between the cathode and the anode.

In accordance with a usual method, the membrane-electrode assembly for a polymer electrolyte fuel cell can be obtained, for example, as follows. Firstly, a uniform dispersion comprising a conductive carbon black powder having fine particles of platinum catalyst or platinum alloy catalyst supported thereon and a liquid composition containing the electrolyte material, is obtained, and a gas diffusion electrode is formed by any one of the following methods, to obtain a membrane-electrode assembly.

The first method is a method wherein the above dispersion is applied to both sides of the electrolyte membrane and dried, and then two sheets of carbon paper or carbon cloth are bonded to both sides. The second method is a method wherein the above dispersion is coated on two sheets of carbon paper or carbon cloth and dried, and then, the electrolyte membrane is sandwiched from both sides by them so that the side coated with the dispersion will be bonded to the electrolyte membrane. The third method is a method wherein the above dispersion is coated on a separately prepared substrate film and dried to form a catalyst layer, and then, the catalyst layer is transferred to each side of the electrolyte membrane, and further, two sheets of carbon paper or carbon cloth are bonded to both sides. Here, the carbon paper or carbon cloth has a function as a current collector as well as a function as a gas diffusing layer to uniformly diffuse the gas by the layer containing the catalyst.

The obtained membrane-electrode assembly is sandwiched between separators having grooves formed to constitute channels for fuel gas or oxidizing gas, and hydrogen gas is supplied to the anode side of the membrane-electrode assembly, and oxygen or air is supplied to the cathode side, thereby to constitute a polymer electrolyte fuel cell.

EXAMPLES

Now, the present invention will be described in further detail with reference to Examples and Comparative Examples, but it should be understood that the present invention is by no means thereby restricted.

Example 1

Preparation Example 1

(1) A polymerization tank having an internal capacity of 94 L and equipped with a stirrer, was deaerated and charged with 87.3 kg of 1,3-dichloro-1,1,2,2,3-pentafluoropropane (AK225cb, hereinafter referred to as "AK225cb", manufactured by Asahi Glass Company, Limited) and 860 g of $CH_2=CH(CF_2)_4F$. With stirring, the interior of the polymerization tank was heated to 66° C., and a mixed gas of TFE/E=89/11 (molar ratio) was introduced until the pressure in the polymerization tank became 1.4 MpaG. As a polymerization initiator, 667 g of a 1 mass % AK225cb solution of tert-butyl peroxypivalate was charged to initiate the polymerization.

A mixed gas having a composition of TFE/E=60/40 (molar ratio) and $CH_2=CH(CF_2)_4F$ in a ratio corresponding to 3.3 mol % to the mixed gas, were continuously charged so that the pressure became constant during the polymerization. Upon expiration of 8 hours after the initiation of the polymerization, when 7.1 kg of the monomer mixed gas was charged, the temperature in the interior of the polymerization tank was lowered to room temperature, and the tank was purged to the atmospheric pressure.

(2) The obtained ETFE in a slurry form was put into a 200 L granulation tank having 77 kg of water charged, and then the temperature was raised to 105° C. with stirring for granulation while distilling the solvent off. The obtained granulated product was dried at 150° C. for 5 hours to obtain 7.0 kg of sample ETFE (hereinafter referred to as "ETFE1").

The polymer composition of the ETFE1 was such that repeating units based on TFE/repeating units based on E/repeating units based on $CH_2=CH(CF_2)_4F=57.2/40.3/2.5$ mol %. Further, the melting point was 225° C., and the melt viscosity at 240° C. was 110 Pa·s.

Method for Forming Nonwoven Fabric Continuous Material

Figure 2:
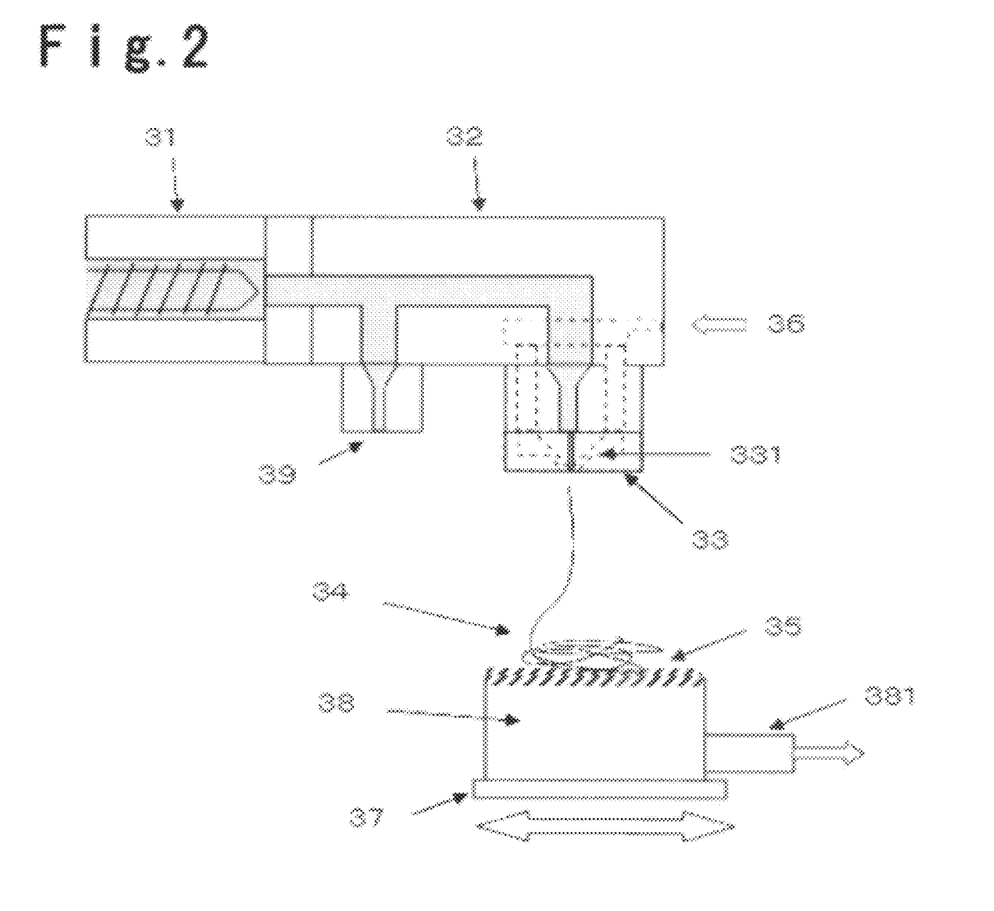
FIG. 2 is a schematic view illustrating an extrusion system to be used in the apparatus for producing a melt-blown nonwoven fabric.

As shown in FIG. 2, a special die 32 having a flow rate-controlling structure and a hot air-introducing structure was attached to a single screw extruder 31 having a diameter of 30 mm (L/D=24, manufactured by Tanabe Plastic K.K.), and at its forward end portion, a special nozzle 33 for production of a melt-blown nonwoven fabric manufactured by Kasen Nozzle Mfg. Co., Ltd., having ten circular outlets each having an inner diameter of 300 μm disposed linearly within an effective width of 10 cm and having, in parallel with the disposed direction, stretching air outlets 331 capable of blowing a hot air 36 from a 500 μm slit so as to apply a stretching stress to the discharged resin. Using ETFE1, a nonwoven fabric A1 (34) was formed on a 20 mesh stainless steel mesh 35 set on an air suction device 38 having a suction pump 381 on a driven stage 37, at a die temperature of 360° C. by blowing a hot air 36 for stretching at a temperature of 330° C. at a flow rate of 3 $Nm^3/hr$. At that time, the extruder was operated at a rotational speed of 5 rpm; from an outlet 39 for excess resin, the resin was discharged at a flow rate of 3.7 g/min, and from the nozzle for forming a nonwoven fabric, the resin was discharged at a flow rate of about 0.3 g/min.

The mesh was continuously driven in one direction at a rate of 6 m/min, so that a nonwoven fabric A1 with a width of about 5 cm and 5 $g/m^2$ was prepared thereon. A part of this nonwoven fabric was sampled, and evaluation of the average fiber diameter was carried out by an electron microscopic observation, whereby the average diameter was found to be 0.8 μm.

This nonwoven fabric had somewhat low strength, but it was possible to wind it up on a paper pipe having an inner diameter of 3 inch and a wall thickness of 7 mm thereby to obtain a nonwoven fabric continuous material RA1 having a length of 3 m.

Thickness Adjustment (Densification)

Figure 3:
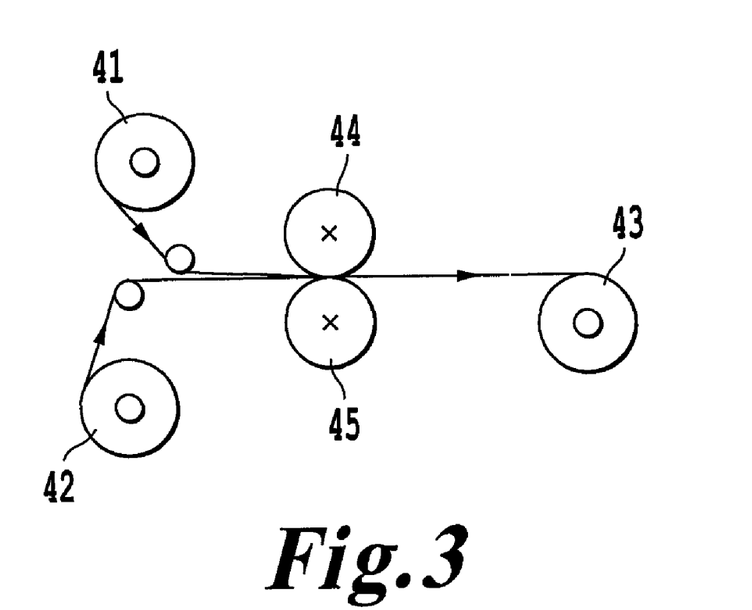
FIG. 3 is a schematic view illustrating a continuous processing apparatus for densification of nonwoven fabric/temporary press bonding of PET.

Then, by means of a simple laminating apparatus (VAII-700 manufactured by TAISEI LAMINATOR K.K.) as shown in FIG. 3, the nonwoven fabric continuous material RA1 (41) was laminated with a commercially available continuous polyethylene terephthalate support 42 having a thickness of 100 μm and densified to obtain a continuous PET support/densified nonwoven fabric continuous material RAP1 (43). The thickness of the densified nonwoven fabric continuous material RAP1 was measured by a contact type micrometer (AT-005V, 5 mmφ circular tip, manufactured by KEYENCE Corporation), whereby the average thickness was found to be 10 μm. Here, at the time of densification, the temperature of the metal roll 44 and the temperature of the rubber roll 45 were 140° C.; the roll pressure was 0.026 MPa/m against the roll surface length of 600 mm; and the feed rate of the continuous PET support was 0.15 m/min.

The obtained temporarily press-bonded product of continuous PET support/densified nonwoven fabric RAP1 (43) was excellent in handling efficiency.

Corona Discharge Treatment

Surface treatment was continuously applied to this temporarily press-bonded product of continuous PET support/densified nonwoven fabric RAP1 (43) by means of a commercially available corona discharge treating machine (Corona Generator Model HV 05-2, manufactured by tantec).

Production of Layer not Reinforced, Made of Ion Exchange Resin

Then, a solution of an ion exchange resin (Flemion (registered trademark) manufactured by Asahi Glass Company, Limited) in ethanol (FSS-2, solid content: 9%) was cast on a fluororesin film (Fluon ETFE film (100N (thickness: 100 µm) (registered trademark)) manufactured by Asahi Glass Company, Limited) by die coating and dried at 80° C. for 5 minutes to obtain a layer not reinforced, made of the above ion exchange resin and having a thickness of 3 µm.

Method for Forming Electrolyte Membrane

Then, by means of a simple laminating apparatus (VAII-700, manufactured by TAISEI LAMINATOR K.K.) as shown in FIG. 3, the surface treated continuous PET support/densified nonwoven fabric RAP1 and the layer not reinforced, having a thickness of 3 µm, were hot-pressed to obtain a continuous PET support/intermediate laminate P1. Here, at the time of densification, the temperature of the metal roll and the temperature of the rubber roll were 120° C.; the roll pressure was 0.026 MPa/m against the roll surface length of 600 mm; and the feed rate of the continuous PET support was 0.15 m/min.

Figure 4:
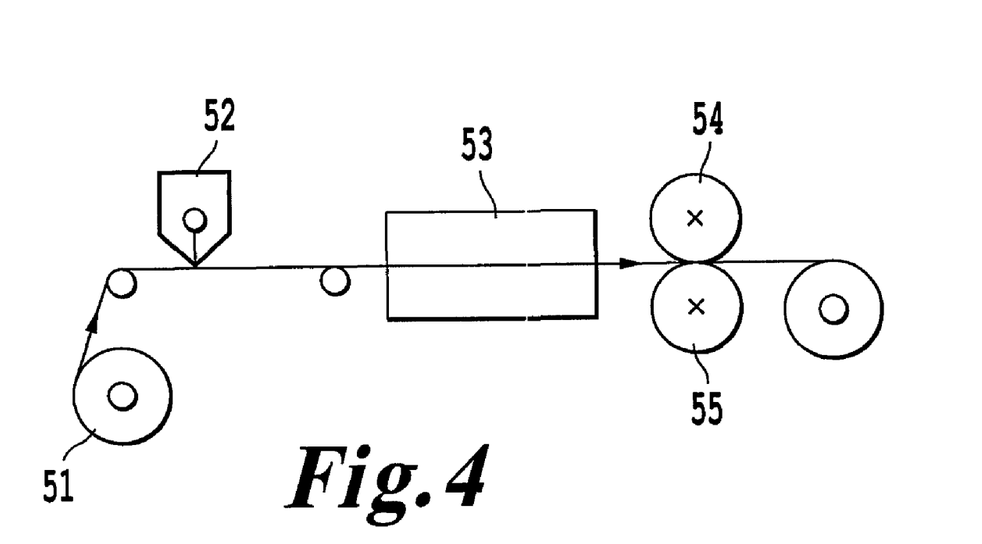
FIG. 4 is a schematic view illustrating a continuous coating system for producing a reinforced electrolyte membrane.

Then, by means of a continuous coating system as shown in FIG. 4, the solution of the ion exchange resin (Flemion (registered trademark) manufactured by Asahi Glass Company, Limited) in ethanol (FSS-2, solid content: 9%) was applied on the surface of the intermediate laminate P1 (51) obtained by peeling the continuous PET support from the continuous PET support/intermediate laminate P1, by means of a die coater 52 and dried in a drying furnace 53 and further pressed by the metal roll 54 and the rubber roll 55. Thereafter, the obtained pressed product was cut into a sheet, which was further dried to remove the residual solvent, etc. under a condition of 140° C. for 30 minutes to obtain an electrolyte membrane R1 having a thickness of the entire electrolyte membrane being 16 µm. Further, from the observation of the cross section by an electron microscope, the thickness of the layer not reinforced at the surface was about 3 µm on each side, and the thickness of the reinforced layer was 10 µm.

Measurement of Dimensional Change Upon Absorption of Water

The electrolyte membrane R1 is cut out in a square of 200 mm×200 mm and exposed to an atmosphere at a temperature of 25° C. under a humidity of 50% for 16 hours, whereupon the longitudinal and transverse lengths of the sample are measured. Then, the sample is dipped in deionized water at 90° C. for one hour, whereupon the longitudinal and transverse lengths are measured in the same manner. The average value of the elongation in the longitudinal direction and the elongation in the transverse direction of the sample is obtained and taken as the dimensional change.

Preparation of Polymer Electrolyte Fuel Cell and Measurement of Membrane Resistance Water and ethanol are sequentially added to platinum-supported carbon to obtain a dispersion of catalyst (solid content: 9 mass %) dispersed in a mixed dispersing medium of ethanol and water (mass ratio of 1:1). Then, an ethanol solution (FSS-2, solid content: 9%) of an ion exchange resin (Flemion (registered trademark) manufactured by Asahi Glass Company, Limited) and the catalyst dispersion are mixed in a mass ratio of 11:3 to prepare a coating liquid. Then, this coating liquid is applied to each side of the electrolyte membrane R1 by a die-coating method and dried to form a catalyst layer having a thickness of 10 µm and having a platinum-supported amount of 0.5 mg/cm$^2$ on each side of the membrane. Further, on each outside, a carbon cloth is disposed as a gas diffusion layer to obtain a membrane-electrode assembly. On each side of this membrane-electrode assembly, a separator made of a carbon plate having fine grooves for gas passage formed in a zig-zag fashion is disposed, and further on its outside, a heater is disposed, whereby a polymer electrolyte fuel cell having an effective membrane surface of 25 cm$^2$ is assembled.

While the fuel cell is maintained at a temperature of 80° C., nitrogen is supplied to the cathode and hydrogen is supplied to the anode, respectively at 0.15 MPa. At that time, the humidity of both gases was 100% RH. In this state, measurement of the impedance was carried out as described in Determination of electrode sheet resistance in cathode catalyst layer by AC impedance, Liu, Y.; Murphy, M. W.; Baker, D. R.; Gu, W.; Ji, C.; Jorne, J.; Gasteiger, H. A. Department of Chemical Engineering, University of Rochester, Rochester, N.Y., USA. ECS Transactions (2007), 11 (1, Part 1, Proton Exchange Membrane Fuel Cells 7, Part 1), 473-484, Publisher: Electrochemical Society, and the membrane resistance in the thickness direction of the membrane was measured. These results are shown in Table 1. Here, with respect to the contact resistance or the like, it was obtained by extrapolation to a thickness zero by using non-reinforced membranes having different thicknesses, and it is deducted from the cell resistance in each measurement to calculate the membrane resistance in the thickness direction of the membrane single substance.

Example 2

Preparation Example 2

(1) Into a 430 L evacuated stainless steel autoclave, 164.8 kg of $CF_3(CF_2)_5H$, 168.0 kg of AK-225cb, 337 kg of $CH_2\!=\!CH(CF_2)_4F$ and 89 kg of deionized water were charged, and the interior of the polymerization tank was heated to 65° C. with stirring, whereupon a mixed gas of TFE/E=89/11 (molar ratio) was introduced to 1.4 MPaG, and 40.1 g of a solution obtained by diluting an AK225cb solution of 50 mass % of tert-butyl peroxypivalate with $CH_2\!=\!CH(CF_2)_4F$ until tert-butyl peroxypivalate became 1 wt %, was charged to initiate the polymerization.

During the polymerization, a mixed gas of TFE/E=59/41 (molar ratio) and $CH_2\!=\!CH(CF_2)_4F$ in an amount corresponding to 3.3 mol % to the above mixed gas, were continuously added so that the pressure became 1.4 MPaG, and after charging 30 kg of a tetrafluoroethylene/ethylene mixed gas, the autoclave was cooled, and the residual gas was purged to complete the polymerization. The time required for the polymerization was 420 minutes.

(2) The obtained ETFE in a slurry form was put into a 850 L granulation tank having 250 L of water charged, and then, the temperature was raised with stirring and granulation was carried out while removing the polymerization solvent or the residual monomer to obtain 33 kg of a granulated product (hereinafter referred as "ETFE2").

The polymer composition of the ETFE2 was such that repeating units based on TFE/repeating units based on E/repeating units based on $CH_2\!=\!CH(CF_2)_4F$=57.9/39.1/3.0 mol %; and the melting point was 227° C., and the melt viscosity at 240° C. was 1,000 Pa·s.

An electrolyte membrane R2 as shown in Table 1, was prepared in the same manner as in Example 1 except that ETFE2 was employed instead of ETFE1. Further, evaluation in the same manner as in Example 1 was carried out. The results are shown in Table 1.

Comparative Example 1

Using a fluororesin having a melting point of 300° C. (Aflon PFA (registered trademark) (MFR 40 g/10 min), manufactured by Asahi Glass Company, Limited), fiber was formed in the same manner as the method for forming a nonwoven fabric continuous material in Example 1, and a fluororesin (a 2% solution of Cytop (registered trademark) (solvent: CTL-100), manufactured by Asahi Glass Company, Limited) was sprayed to obtain a nonwoven fabric R-comp1. Then, under the same condition (roll temperature: 140° C.) as in the method for adjustment of the thickness (densification) in Example 1, densification and temporary press bonding on a continuous PET support were attempted, but under the same condition, no adequate densification was possible, and temporary press bonding to the continuous PET support was not possible. The thickness of the nonwoven fabric at that time was as thick as 22 μm.

Even when the roll temperature was raised, the situation was not improved, and when the roll temperature exceeded 230° C., the polyethylene terephthalate film started to be deformed, whereby it was found that a roll press method using a polyethylene terephthalate film is impossible.

Therefore, the attempt for densification of the nonwoven fabric R-comp1 was abandoned, and the nonwoven fabric R-comp1 was cut into a sheet, and by means of a polyimide tape provided with an adhesive, the nonwoven fabric R-comp1 cut into the sheet, was bonded and fixed to a continuous PET support to prepare a continuous PET support/nonwoven fabric R-comp1. Then, an electrolyte membrane R5 was prepared in the same manner as the method for forming electrolyte membrane in Example 1 except that this composite was used instead of the continuous PET support/densified nonwoven fabric RAP1. Using the electrolyte membrane R5, the same evaluations as in Example 1 were carried out. The results are shown in Table 1.

Comparative Example 2

Using a fluororesin having a melting point of 260° C. (Aflon ETFE (registered trademark) (MFR: 40 g/10 min), manufactured by Asahi Glass Company, Limited), fiber was formed in the same manner as the method for forming nonwoven fabric continuous material in Example 1 (nonwoven fabric continuous material RA3). Using this nonwoven fabric continuous material RA3, densification and temporary press bonding on a continuous PET support were attempted under the same condition (roll temperature: 140° C.) as the method for adjusting the thickness (densification) in Example 1, but under the same condition, no adequate densification was possible, and temporary press bonding to the continuous PET support was not possible. The thickness of the nonwoven fabric at that time was as thick as 21 μm.

Therefore, the attempt for densification of the nonwoven fabric continuous material RA3 was abandoned, and the nonwoven fabric continuous material RA3 was cut into a sheet, and by using a polyimide tape provided with an adhesive, the nonwoven fabric continuous material RA3 cut into a sheet was bonded and fixed to a continuous PET support to prepare a continuous PET support/nonwoven fabric continuous material RA3. Then, an electrolyte membrane R6 was prepared in the same manner as the method for forming electrolyte membrane in Example 1 except that this composite was used instead of the continuous PET support/densified nonwoven fabric RAP1. Using the electrolyte membrane R6, the same evaluations as in Example 1 were carried out. The results are shown in Table 1.

Comparative Example 3

An ethanol solution (FSS-2, solid content: 9%) of an ion exchange resin (Flemion (registered trademark), manufactured by Asahi Glass Company, Limited) was cast on a fluororesin film (Fluon ETFE film (registered trademark), product number 100N (thickness: 100 μm), manufactured by Asahi Glass Company, Limited) by die coating and dried at 80° C. for 5 minutes and then dried at 160° C. for 30 minutes to remove the residual solvent thereby to obtain an electrolyte membrane R7 made of the above mentioned ion exchange resin and having a thickness of 25 μm. Using this membrane, the same evaluations as in Example 1 were carried out. The results are shown in Table 1.

TABLE 1

| | Ex. 1 | Ex. 2 | Comp. Ex. 1 | Comp. Ex. 2 | Comp. Ex. 3 |
|---|---|---|---|---|---|
| Electrolyte membrane | R1 | R2 | R5 | R6 | R7 |
| Average fiber diameter (μm) | 0.8 | 4.2 | 9 | 8 | — |
| Thickness of nonwoven fabric (μm) | 10 | 10 | 22 | 21 | — |
| Thickness of layer not reinforced (μm) | 3 | 3 | 3 | 3 | 25 |
| Entire thickness of electrolyte membrane (μm) | 16 | 16 | 28 | 27 | 25 |
| Dimensional change (%) | 8 | 6.7 | 15 | 15 | 26 |
| Membrane resistance (mΩ/cm$^2$) | 17 | 18 | 40 | 44 | 17 |

INDUSTRIAL APPLICABILITY

According to the present invention, a nonwoven fabric to be used for reinforcement can efficiently be produced, and it is possible to obtain an electrolyte membrane which has high mechanical strength even when the thickness is thin and which is excellent in dimensional stability upon absorption of water and has an excellent proton conductance. And, a membrane-electrode assembly obtained by using such an electrolyte membrane provides a polymer electrolyte fuel cell having excellent performance and high durability.

The entire disclosure of Japanese Patent Application No. 2008-073693 filed on Mar. 21, 2008 including specification, claims, drawings and summary is incorporated herein by reference in its entirety.

What is claimed is:

1. An electrolyte membrane, comprising:
    (A) a first layer comprising a first ion exchange resin; and
    (B) a reinforcement comprising a nonwoven fabric comprising a fiber comprising a fluororesin, wherein at least one intersecting point of the fiber is fixed by fusion of the fiber; and
    (C) as an outermost layer on one side or each side, a second layer which is not reinforced, comprising a second ion exchange resin which is the same as or different from the first ion exchange resin,
    wherein the fluororesin is an ethylene/tetrafluoroethylene copolymer having a melting point of from 225 to 240° C.

2. The membrane of claim 1, wherein, in the ethylene/tetrafluoroethylene copolymer, a molar ratio of repeating units based on ethylene to repeating units based on tetrafluoroethylene is from 80/20 to 45/55.

3. The membrane of claim 1, wherein the fiber has an average fiber diameter of from 0.01 μm to 7 μm.

4. The membrane of claim 1, having an entire thickness of from 7.5 μm to 25 μm.

5. The membrane of claim 1, wherein the second layer has a thickness of at least a radius of an average fiber diameter of the fiber.

6. A process for producing the membrane of claim 1, the process comprising:
adjusting a thickness of the nonwoven fabric by hot roll pressing the nonwoven fabric with a roll-to-roll system employing a resin support.

7. The process of claim 6, further comprising:
dispensing a melt-moldable fluororesin in a molten state from a spinning nozzle, to obtain a dispensed resin;
stretching and spinning the dispensed resin by a gas discharged from a gas discharge nozzle disposed in the vicinity of the spinning nozzle, to obtain the fiber; and
forming the fiber into the nonwoven fabric.

8. The process of claim 6, wherein, in the ethylene/tetrafluoroethylene copolymer, a molar ratio of repeating units based on ethylene to repeating units based on tetrafluoroethylene is from 80/20 to 45/55.

9. The process of claim 6, wherein the fiber has an average fiber diameter of from 0.01 μm to 7 μm.

10. The process of claim 6, wherein an entire thickness of the electrolyte membrane is from 7.5 μm to 25 μm.

11. The process of claim 6, wherein the second layer has a thickness of at least a radius of an average fiber diameter of the fiber.

12. A membrane-electrode assembly, comprising:
(C) a cathode;
(A) an anode; and
(B) a polymer electrolyte membrane interposed between the cathode and the anode, wherein the polymer electrolyte membrane (B) comprises (b1) the membrane of claim 1, and
wherein the cathode and the anode each comprise a catalyst layer comprising a catalyst and an ion exchange resin.

13. The membrane-electrode assembly of claim 12, wherein, in the ethylene/tetrafluoroethylene copolymer, a molar ratio of repeating units based on ethylene to repeating units based on tetrafluoroethylene is from 80/20 to 45/55.

14. The membrane-electrode assembly of claim 12, wherein the fiber has an average fiber diameter of from 0.01 μm to 7 μm.

15. The membrane-electrode assembly of claim 12, wherein an entire thickness of the electrolyte membrane (b1) is from 7.5 μm to 25 μm.

16. The membrane-electrode assembly of claim 12, wherein the second layer has a thickness of at least a radius of an average fiber diameter of the fiber.

* * * * *